(12) United States Patent
Van Cleve (10) Patent No.: US 9,170,142 B2
(45) Date of Patent: Oct. 27, 2015

(54) THERMAL STRESS COMPENSATION IN A CURVED TUBE VIBRATING FLOW METER

(75) Inventor: Craig Brainerd Van Cleve, Lyons, CO (US)

(73) Assignee: Micro Motion, Inc., Boulder, CO (US)

( * ) Notice: Subject to any disclaimer, the term of this patent is extended or adjusted under 35 U.S.C. 154(b) by 411 days.

(21) Appl. No.: 13/816,795

(22) PCT Filed: Oct. 14, 2010

(86) PCT No.: PCT/US2010/052630
§ 371 (c)(1),
(2), (4) Date: Feb. 13, 2013

(87) PCT Pub. No.: WO2012/033504
PCT Pub. Date: Mar. 15, 2012

(65) Prior Publication Data
US 2013/0139613 A1 Jun. 6, 2013

Related U.S. Application Data

(60) Provisional application No. 61/381,260, filed on Sep. 9, 2010.

(51) Int. Cl.
*G01F 1/84* (2006.01)
*G01F 15/02* (2006.01)

(52) U.S. Cl.
CPC .............. *G01F 1/84* (2013.01); *G01F 1/8472* (2013.01); *G01F 1/8477* (2013.01); *G01F 1/8481* (2013.01); *G01F 1/8486* (2013.01); *G01F 15/022* (2013.01); *G01F 15/024* (2013.01)

(58) Field of Classification Search
None
See application file for complete search history.

(56) References Cited

U.S. PATENT DOCUMENTS

| 5,295,084 | A | 3/1994 | Arunachalam et al. |
| 5,796,011 | A | 8/1998 | Keita et al. |
| 6,327,915 | B1 | 12/2001 | Van Cleve et al. |
| 6,512,987 | B1 | 1/2003 | Pattern |
| 6,807,868 | B1 * | 10/2004 | Nakao et al. ............. 73/861.355 |
| 7,549,319 | B2 * | 6/2009 | Headrick ....................... 73/32 A |
| 2013/0305837 | A1 * | 11/2013 | Van Cleve ................. 73/861.02 |

FOREIGN PATENT DOCUMENTS

| CN | 1290853 A | 4/2001 |
| EP | 1091196 A2 | 4/2001 |
| JP | 2001174307 | 6/2001 |
| WO | 0102816 A2 | 1/2001 |
| WO | 0171290 A1 | 9/2001 |
| WO | 2008039203 A1 | 4/2008 |
| WO | 2009051588 A1 | 4/2009 |

* cited by examiner

*Primary Examiner* — Robert R Raevis
(74) *Attorney, Agent, or Firm* — The Ollila Law Group LLC (57) ABSTRACT

A curved tube vibrating flow meter (5) includes a flow tube temperature sensor $T_T$ (190) and a plurality of case temperature sensors $T_C$ (303) affixed to one or more case locations of a case (300) of the curved tube vibrating flow meter (5). The plurality of case temperature sensors $T_C$ (303) generate a case temperature signal, wherein a plurality of case temperature sensor resistances at the one or more case locations form a combined case resistance related to thermal importances of the one or more case locations. Meter electronics (20) receives the flow tube temperature signal, receives the case temperature signal, and compensates the curved tube vibrating flow meter (5) for thermal stress using the flow tube temperature signal and the case temperature signal.

20 Claims, 5 Drawing Sheets

THERMAL STRESS COMPENSATION IN A CURVED TUBE VIBRATING FLOW METER

BACKGROUND OF THE INVENTION

1. Field of the Invention

The present invention relates to a curved tube vibrating flow meter, and more particularly, to thermal stress compensation in a curved tube vibrating flow meter.

2. Statement of the Problem

Vibrating tube sensors, such as Coriolis mass flowmeters and vibrating densitometers, typically operate by detecting motion of a vibrating tube or tubes that contains a flowing material. Properties associated with the material in the tube, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical Coriolis mass flowmeter includes one or more tubes that are connected inline in a pipeline or other transport system and convey material, e.g., fluids, slurries, emulsions, and the like, in the system. Each tube may be viewed as having a set of natural vibration modes, including for example, simple bending, torsional, radial, and coupled modes. In a typical Coriolis mass flow measurement application, a tube is excited in one or more vibration modes as a material flows through the tube, and motion of the tube is measured at points spaced along the tube. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Frequency of the vibrational response may be measured by a single transducer, wherein the frequency is used to determine the density of material in the meter. Two such transducers (or pickoff sensors) are typically employed in order to measure a vibrational response of the flow conduit or conduits, and are typically located at positions upstream and downstream of the actuator. The two pickoff sensors are connected to electronic instrumentation. The instrumentation receives signals from the two pickoff sensors and processes the signals in order to derive a mass flow rate measurement, among other things. Vibrating flow meters, including Coriolis mass flowmeters and densitometers, therefore employ one or more flow tubes that are vibrated in order to measure a fluid.

Vibratory meters may be used with hot or cold flow materials. However, thermal stress is induced in a flow meter when the meter's flow tube or tubes are at a different temperature than other parts of the meter assembly. For instance, when hot fluid is suddenly introduced into a cold meter, the flow tube tries to expand in length but is constrained by the (relatively) cold case. This situation is known as thermal shock. In the more common steady-state situation, the fluid is hot but the ambient environment is cold and a temperature gradient exists across portions of the meter as a result.

In a typical flowmeter, the thermal expansion or contraction may be constrained or prevented by the design of the flowmeter. The thermal differences in the meter therefore create thermal stress on the flow tube or tubes of the meter. For example, a tube's axial expansion or contraction may be constrained by the meter case.

U.S. Pat. No. 6,327,915 to Van Cleve discloses a straight tube Coriolis flowmeter including a balance bar and temperature sensors S1-S4. A single temperature sensor S4 is used to measure the temperature of the case. The network of temperature sensors provides temperature information that is used to perform thermal stress compensation, wherein temperature changes will cause compression or tension forces on the vibrating tube, affecting the resonant frequency of the straight flow tube.

A straight tube vibrating meter, due to its shape, does not have a bending stress, as is present in a curved tube meter. A straight tube vibrating meter does not require multiple case temperature measurements or case temperature measurements at specific locations which will affect a tube bending stress.

It is well known that Coriolis flow meters having dual-curved tubes are of the highest accuracy in terms of flow measurement. They are also of high accuracy in density measurement, but not as accurate as some currently produced densitometers having a single straight tube.

However, despite their advantages, straight tube densitometers have disadvantages. The straight and relatively rigid flow tubes cannot freely expand or contract because of the constraint of the case and other components. The resulting thermal compression or tension on a straight tube vibrating densitometer will change the resonant frequency. This effect of heating or cooling, with the resulting constrained expansion or contraction of the flowmeter, is called thermal stress.

Single straight tube densitometers achieve their accuracy in part by inclusion of a bellows at either end of the active flow tube, wherein the bellows allows thermal expansion and contraction of the flow meter assembly. The bellows therefore isolate the flow tube from the thermal stress that could otherwise change the frequency of the flow tube and thus impair the accuracy of the meter.

Bellows have several disadvantages. First, they limit the fluid pressure rating of the meter. Second, they impair the ability of the meter to be rated as sanitary, as the bellows will trap and retain flow material after a flow is stopped. Third, the bellows require more expensive and complicated construction and therefore have a higher cost.

ASPECTS OF THE INVENTION

In one aspect of the invention, a curved tube vibrating flow meter comprises:
 a flow tube temperature sensor $T_T$ affixed to one or more curved flow tubes of the curved tube vibrating flow meter, with the flow tube temperature sensor $T_T$ generating a flow tube temperature signal;
 a plurality of case temperature sensors $T_C$ affixed to one or more case locations of a case of the curved tube vibrating flow meter and generating a case temperature signal, wherein a plurality of case temperature sensor resistances at the one or more case locations form a combined case resistance related to thermal importances of the one or more case locations; and
 meter electronics configured to receive the flow tube temperature signal, receive the case temperature signal, and compensate the curved tube vibrating flow meter for thermal stress using the flow tube temperature signal and the case temperature signal.

Preferably, the curved tube vibrating flow meter comprises a single curved tube vibrating flow meter.

Preferably, the curved tube vibrating flow meter comprises a dual curved tube vibrating flow meter.

Preferably, the at least one case temperature sensor $T_C$ comprises multiple case temperature sensors $T_C$ that generate a representative case temperature signal.

Preferably, the one or more case locations comprises two or more case locations, wherein the plurality of case temperature sensors $T_C$ form a predetermined case resistance ratio related to thermal importances of each case location of the two or more case locations.

Preferably, the meter electronics are further configured to compensate the curved tube vibrating flow meter for a change in curved tube bending stress with a change in temperature, with the compensating using the flow tube temperature sensor signal and case temperature signal.

Preferably, the curved tube vibrating flow meter includes a manifold and a first case temperature sensor $T_C$ is located on the case substantially at the manifold.

Preferably, a second case temperature sensor $T_C$ is located substantially on the case between tube ends.

In one aspect of the invention, a curved tube vibrating flow meter comprises:
- a flow tube temperature sensor $T_T$ affixed to one or more curved flow tubes of the curved tube vibrating flow meter, with the flow tube temperature sensor $T_T$ generating a flow tube temperature signal;
- a plurality of case temperature sensors $T_C$ affixed to two or more case locations of a case of the curved tube vibrating flow meter and generating a case temperature signal, wherein a plurality of case temperature sensor resistances at the two or more case locations form a predetermined case resistance related to thermal importances of the two or more case locations,
- meter electronics configured to receive the flow tube temperature signal, receive the case temperature signal, and compensate the curved tube vibrating flow meter for thermal stress using the flow tube temperature signal and the case temperature signal.

Preferably, the curved tube vibrating flow meter comprises a single curved tube vibrating flow meter.

Preferably, the curved tube vibrating flow meter comprises a dual curved tube vibrating flow meter.

Preferably, the multiple case temperature sensors $T_C$ generate a representative case temperature signal.

Preferably, the meter electronics are further configured to compensate the curved tube vibrating flow meter for a change in curved tube bending stress with a change in temperature, with the compensating using the flow tube temperature signal and the case temperature signal.

Preferably, the curved tube vibrating flow meter includes a manifold and a first case temperature sensor $T_C$ is located on the case substantially at the manifold.

Preferably, a second case temperature sensor $T_C$ is located substantially on the case between tube ends.

In one aspect of the invention, a thermal stress compensation method in a curved tube vibrating flow meter comprises:
- measuring a flow tube temperature of a curved flow tube of the curved tube vibrating flow meter and generating a flow tube temperature signal;
- measuring a case temperature using a plurality of case temperature sensors affixed to one or more case locations of a case of the curved tube vibrating flow meter and generating a case temperature signal, wherein a plurality of case temperature sensor resistances at the one or more case locations form a combined case resistance related to thermal importances of the one or more case locations; and
- compensating the curved tube vibrating flow meter for thermal stress using the flow tube temperature signal and the case temperature signal.

Preferably, the curved tube vibrating flow meter comprises a single curved tube vibrating flow meter.

Preferably, the curved tube vibrating flow meter comprises a dual curved tube vibrating flow meter.

Preferably, the plurality of case temperature sensors generate a representative case temperature signal.

Preferably, the one or more case locations comprise two or more case locations, wherein the two or more case temperature sensors form a predetermined case resistance ratio related to thermal importances of each case location of the two or more case locations.

Preferably, further comprising compensating the curved tube vibrating flow meter for a change in bending stress with a change in temperature, with the compensating using the flow tube temperature signal and the case temperature signal.

DETAILED DESCRIPTION OF THE INVENTION

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
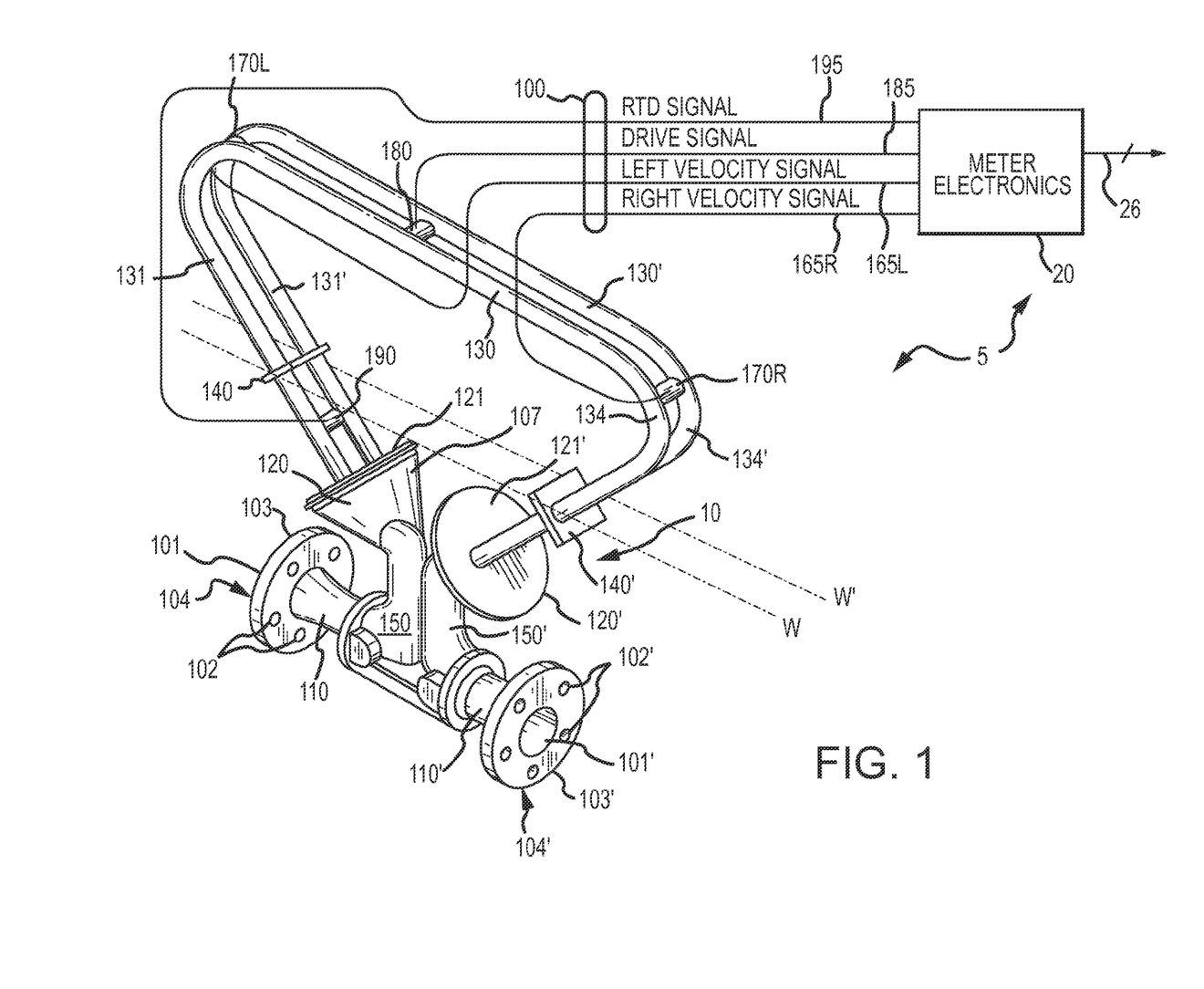
FIG. 1 shows a Coriolis flow meter comprising a meter assembly and meter electronics.

FIG. 1 shows a Coriolis flow meter 5 comprising a meter assembly 10 and meter electronics 20. Meter assembly 10 responds to mass flow rate and density of a process material. Meter electronics 20 is connected to meter assembly 10 via leads 100 to provide density, mass flow rate, and temperature information over path 26, as well as other information not relevant to the present invention. A Coriolis flow meter structure is described although it is apparent to those skilled in the art that the present invention could be practiced as a vibrating tube densitometer without the additional measurement capability provided by a Coriolis mass flow meter.

Meter assembly 10 includes a pair of manifolds 150 and 150', flanges 103 and 103' having flange necks 110 and 110', a pair of parallel flow tubes 130 and 130', drive mechanism 180, temperature sensor 190, and a pair of velocity sensors 170L and 170R. Flow tubes 130 and 130' have two essentially straight inlet legs 131 and 131' and outlet legs 134 and 134' which converge towards each other at flow tube mounting blocks 120 and 120'. Flow tubes 130 and 130' bend at two symmetrical locations along their length and are essentially parallel throughout their length. Brace bars 140 and 140' serve to define the axis W and W' about which each flow tube oscillates.

The side legs 131, 131' and 134, 134' of flow tubes 130 and 130' are fixedly attached to manifolds 150 and 150'. This provides a continuous closed material path through Coriolis meter assembly 10.

When flanges 103 and 103', having holes 102 and 102' are connected, via inlet end 104 and outlet end 104' into a process line (not shown) which carries the process material that is being measured, material enters end 104 of the meter through an orifice 101 in flange 103 is conducted through manifold 150 having a surface 121. Within manifold 150 the material is divided and routed through flow tubes 130 and 130'. Upon exiting flow tubes 130 and 130', the process material is recombined in a single stream within manifold 150' and is thereafter routed to exit end 104' connected by flange 103' having bolt holes 102' to the process line (not shown).

Flow tubes 130 and 130' are selected and appropriately mounted to the flow tube mounting blocks 120 and 120' so as to have substantially the same mass distribution, moments of inertia and Young's modulus about bending axes W-W and W'-W', respectively. These bending axes go through brace bars 140 and 140'. Inasmuch as the Young's modulus of the flow tubes change with temperature, and this change affects the calculation of flow and density, resistive temperature detector (RTD) 190 is mounted to flow tube 130', to continuously measure the temperature of the flow tube. The temperature of the flow tube and hence the voltage appearing across the RTD for a given current passing therethrough is governed by the temperature of the material passing through the flow tube. The temperature dependent voltage appearing across the RTD is used in a well known method by meter electronics 20 to compensate for the change in elastic modulus of flow tubes 130 and 130' due to any changes in flow tube temperature. The RTD is connected to meter electronics 20 by lead 195.

Both flow tubes 130 and 130' are driven by driver 180 in opposite directions about their respective bending axes W and W' and at what is termed the first out-of-phase bending mode of the flow meter. This drive mechanism 180 may comprise any one of many well known arrangements, such as a magnet mounted to flow tube 130' and an opposing coil mounted to flow tube 130 and through which an alternating current is passed for vibrating both flow tubes. A suitable drive signal is applied by meter electronics 20, via lead 185, to drive mechanism 180.

Meter electronics 20 receives the RTD temperature signal on lead 195, and the left and right velocity signals appearing on leads 165L and 165R, respectively. Meter electronics 20 produces the drive signal appearing on lead 185 to drive element 180 and vibrate tubes 130 and 130'. Meter electronics 20 processes the left and right velocity signals and the RTD signal to compute the mass flow rate and the density of the material passing through meter assembly 10. This information, along with other information, is applied by meter electronics 20 over communication path 26. The communication path 26 provides an input and an output means that allows the meter electronics 20 to interface with an operator or with other electronic systems. The description of FIG. 1 is provided merely as an example of the operation of a Coriolis flowmeter and is not intended to limit the teaching of the present invention.

In one embodiment, the flowtubes 103A and 103B comprise substantially delta-shaped flowtubes, as shown. Alternatively, in other embodiments, the flowtubes can comprise substantially U-shaped curved flowtubes. Other curved flowmeter shapes and/or configurations can be used and are within the scope of the description and claims.

Curved tube flow meters do not suffer from the effects of thermal stress in the way straight tube flow meters do. Curved flow tubes, due to their shape, may expand and contract independently of their ends. While straight tubes experience high axial stresses that have a large effect on their frequency, curved tubes experience bending stress that has only a small effect on their frequency. Thus, current curved tube flowmeters use only the tube temperature to compensate for the Young's modulus shift of the flow tube, and do not compensate for thermal stress.

However, some thermal stress may remain. In order to generate density measurements of very high accuracy, there is a need for thermal stress compensation in curved tube vibrating flow meters.

Figure 2:
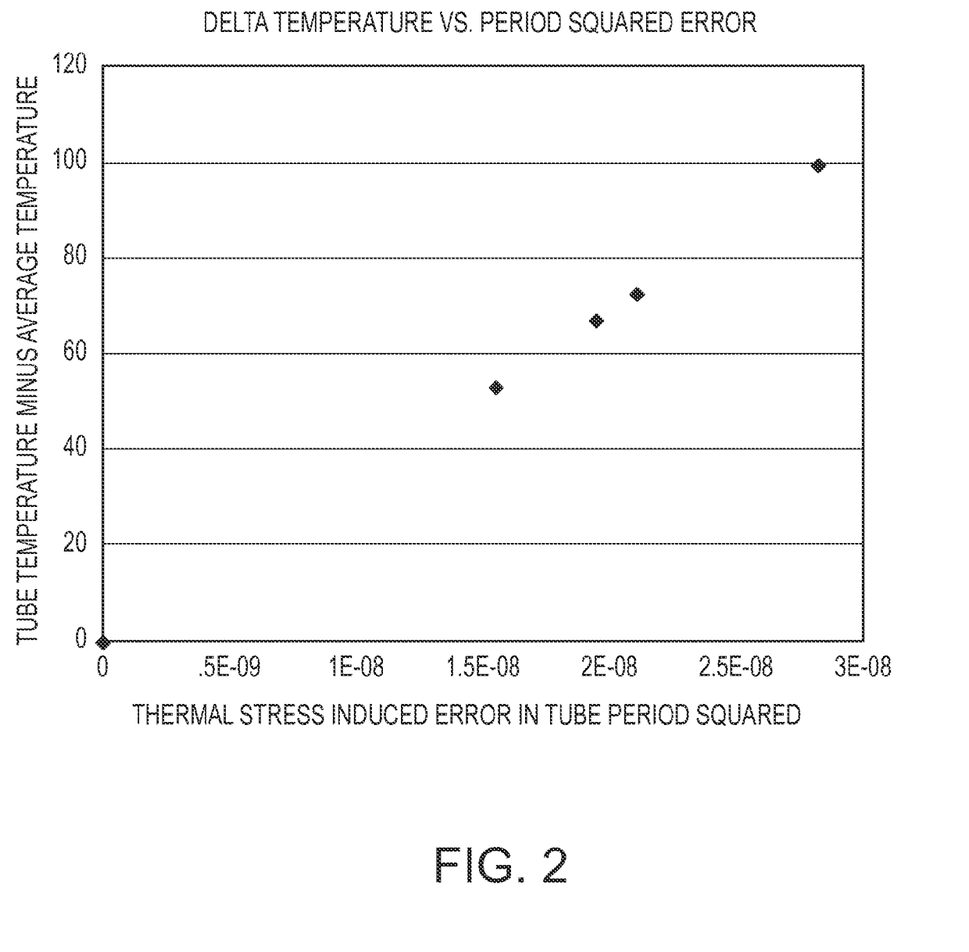
FIG. 2 is a graph of thermal stress-induced error in the tube period squared ($T^2$) versus the difference in temperature between the tube temperature and the combined case temperature.

FIG. 2 is a graph of thermal stress-induced error in the tube period squared ($\Gamma^2$) versus the difference in temperature between the tube temperature and the combined case temperature. The measured vibration frequency (f) is the inverse of the tube period ($\Gamma$) and therefore the tube period squared ($\Gamma^2$) is proportional to density, where density is $\rho \cong C(\Gamma^2)$.

The locations of the case temperature measurements are critical in that they must accurately predict the thermal stress in the tube, and in a variety of thermal conditions. FIG. 2 shows that when temperature measurements are taken at the appropriate locations, there is a linear relationship between the temperature difference (between the tube temperature and the combined case temperature) and the tube period/density measurement.

Case temperature measurements in three locations were used to generate the data in the graph. The flow meter temperature scenarios used to generate the data in the graph included thermal shock, as well as various steady-state situations.

Given a linear relationship between the temperature difference and the error in the tube period squared (due to thermal stress), it is a simple matter to determine the proportionality constant (K) through thermal calibration. Thereafter, the meter can be compensated for the thermal stress error.

Figure 3:
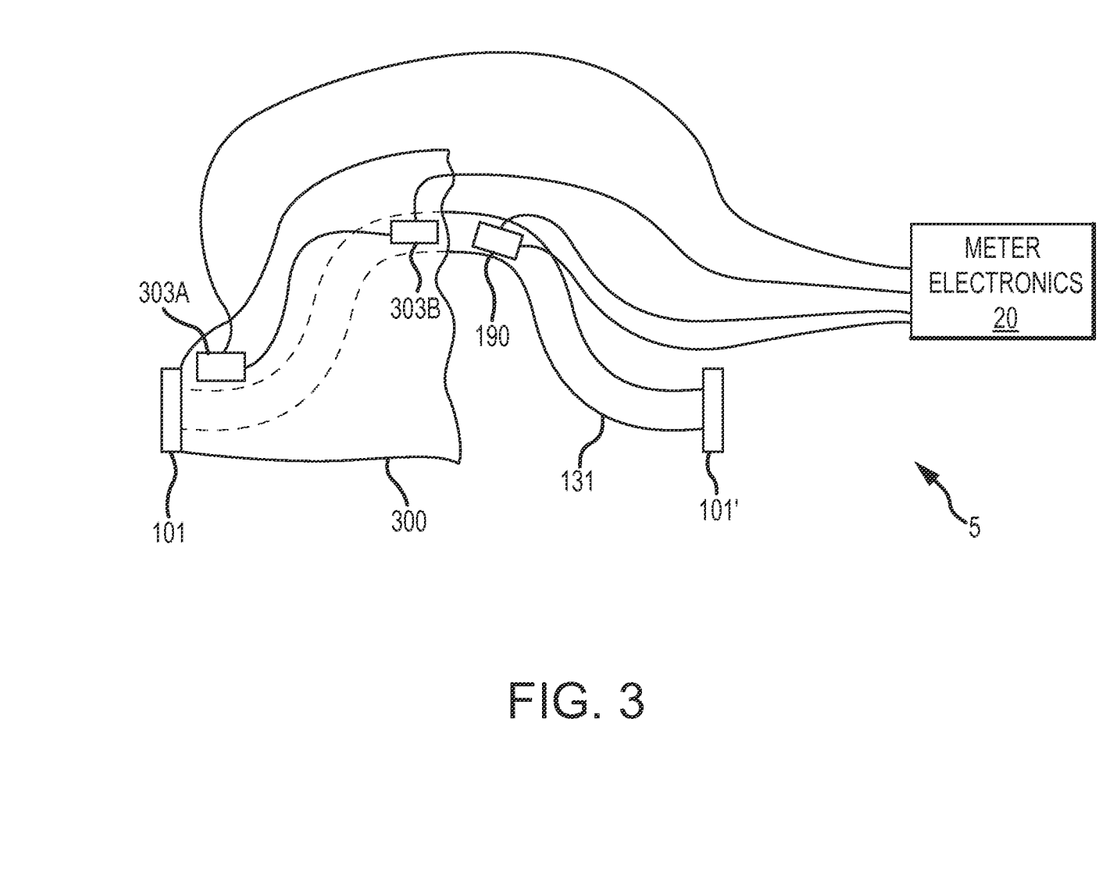
FIG. 3 is a cut-away view that shows the curved tube vibrating flowmeter according to the invention.

FIG. 3 is a cut-away view that shows the curved tube vibrating flowmeter 5 according to the invention. The curved tube vibrating flow meter 5 includes one or more curved flow tubes 131, 131', flanges 101 and 101', and a case 300. The case 300 can enclose all or part of the one or more curved flow tubes 131, 131'. In some embodiments, the case 300 can be removably or permanently affixed to the flanges 101 and 101'.

A flow tube temperature sensor $T_T$ 190 is affixed to (or in thermal communication with) the one or more curved flow tubes 131, 131' and is coupled to the meter electronics 20. The flow tube temperature sensor $T_T$ 190 generates a corresponding flow tube temperature signal. Multiple flow tube temperature sensors may be employed in some embodiments. However, it should be understood that the tubes almost instantly acquire the temperature of the fluid, and thus multiple sensors on the flow tubes are unnecessary. The number of, and position of, the flow tube temperature sensors may be selected according to anticipated conditions and anticipated flow materials.

The temperature of the one or more flow tubes 131, 131' will closely track the temperature of the flow material. As a result, a single flow tube temperature sensor $T_T$ 190 may be sufficient for characterizing the temperature of the flow tube or tubes 131, 131'. However, due to the distance between the case 300 and the one or more curved flow tubes 131, 131', and the enclosing function of the case 300, the thermal response of the case 300 will differ from the thermal response of the one or more curved flow tubes 131, 131'.

A plurality of case temperature sensors $T_C$ 303 are affixed to (or in thermal communication with) the case 300 and are coupled to the meter electronics 20, such as the case temperature sensor $T_C$ 303A and the case temperature sensor $T_C$ 303B, shown. The plurality of case temperature sensors $T_C$ 303 generate a case temperature signal to the meter electronics 20. The number of, and position of, the individual case temperature sensors $T_C$ 303 may be selected according to anticipated conditions and anticipated flow materials. The number of, and position of, the individual case temperature sensors $T_C$ 303 may be selected according to the importance of the position to the thermal stress in the tube. For instance, the temperature of the flanges has no impact on the thermal stress of the flow tube or tubes, and therefore no temperature sensor may need to be put on the flanges. The manifold might have twice the impact as the case temperatures on thermal stress in the tubes, however, and therefore two temperature sensors could be affixed to the manifold and only a single case temperature sensor may need to be put on the case away from the manifold. These three sensors could be connected in series in order to generate a combined case temperature signal.

The combined case temperature can include case temperature sensors on the case, manifolds, balance bars, or other non-flow-tube components of the flow meter 5. The representative case temperature can be formed using electrical circuit techniques such as series or parallel connections, so that a single combined temperature measurement signal is produced.

Alternatively, the at least one case temperature sensor $T_C$ 303 can comprise multiple case temperature sensors $T_C$ 303 that generate a representative case temperature. The plurality of case temperature sensors $T_C$ 303 can be affixed to one or more case locations, wherein a plurality of case temperature sensor resistances at the one or more case locations form a combined case resistance related to thermal importances of the one or more case locations. Alternatively, the one or more case locations comprise two or more case locations, wherein the plurality of case temperature sensors $T_C$ 303 form a predetermined case resistance ratio related to thermal importances of each case location of the two or more case locations.

In operation, heat will be transferred into the case 300 mainly via the manifolds at the ends of the flow tubes. Temperature changes at the center of the case 300 will lag the temperature changes at the ends of the flow meter 5. Preferably, the case of 300 will be formed of a material having a good heat transfer characteristic so that heat will spread relatively rapidly through the case 300.

The temperature of the case 300 will have a different effect on flow meter measurements than the temperature of the one or more curved flow tubes 131, 131'. Changing the temperature of the one or more flow tubes 131, 131' (without changing the temperature of the case 300) will change the tube vibration frequency. The change in vibration frequency results from both a change in elastic modulus and from a change in thermal stress.

The single flow tube temperature sensor is primarily used to compensate for modulus change due to temperature. Due to the curved shape of the one or more flow tubes 131, 131, the one or more flow tubes 131, 131' can flex and absorb most of the relative case expansion or contraction with little tube stress or change in frequency. This is why curved tubes have not required thermal stress compensation in the past. A temperature change in the case 300 alone will change the vibration frequency by changing the thermal stress on the one or more flow tubes 131, 131'. The frequency change may be relatively slight, but even a small change will negatively affect a density measurement. Compensation of the thermal stress in a curved tube flow meter will provide a more accurate density measurement.

The temperature measurements can also be used to compensate the curved tube vibrating flow meter 5 for a change in curved tube bending stress with a change in temperature. The compensating operation can use the flow tube temperature signal and the case temperature signal. It should be understood that the temperature effects will have a different effect on a curved tube flow meter.

Multiple case temperature sensors $T_C$ 303A and 303B may provide a better picture of the thermal reaction of the case 300. For example, the case 300 in the figure includes a first case temperature sensor $T_C$ 303A located substantially at an incoming meter flange 101, 101', and a second case temperature sensor $T_C$ 303B can be located substantially centered on the case 300, at a location between the ends of the flow meter 5. Multiple case temperature sensors can be included between the meter ends if desired.

In the embodiment shown, the curved tube vibrating flow meter 5 includes the manifolds 150 and 150'. The first case temperature sensor $T_C$ 303A is located substantially at one of the manifolds 150 and 150', near the flow tubes 131, 131' in this embodiment. As a result, the first case temperature sensor $T_C$ 303 therefore is positioned to respond quickly to thermal shock, such as due to a significant change in temperature in the incoming flow material, for example.

In the embodiment shown, a second case temperature sensor $T_C$ 303B is located on the case 300 generally midway between the ends. As a result, the second case temperature sensor $T_C$ 303B is positioned to determine a substantially steady-state temperature condition in the case 300.

The locations of the case temperature sensors $T_C$ 303 may be unique to a particular flow meter model. The optimal locations of the case temperature sensors $T_C$ 303 may be found through computer simulation and/or empirically-gathered data. If the temperature network of the case is properly designed, where the case may include manifolds, flanges, the case proper, a balance bar, and any other non-tube parts of the meter, then the single case temperature that is represented by the combination of the RTDs in the case temperature network, along with the tube temperature, will have a substantially known mathematical relationship with resonant frequency of the meter. Consequently, the resistance of an optimally designed resistive temperature sensor network will have a known mathematical relationship to the thermal effect. The difference between the tube temperature and the case temperature measured by the case temperature sensors $T_C$ 303 may be used to compensate the meter, using the known mathematical relationship discussed herein.

If standard Resistive Temperature Devices (RTDs) are used as temperature sensors, then the number of temperature sensors can be selected to form a series connected temperature sensor network, with the number of case temperature sensors both being chosen so as to achieve a thermal importance ratio of case resistances with regard to case locations.

As an example, where the case bottom temperature is twice as important as the case top temperature when using temperature measurements for flow meter temperature compensation, then twice as many temperature sensor elements can be affixed to the case bottom. As a consequence, temperature changes in the case bottom will have twice the effect on sensor electrical resistance as temperature changes in the case top. The resistance change of the three temperature sensors in series is then divided by three to give the weighted average temperature of the case 300. Multiple temperature sensors can also be put in parallel, or in other electrical network configurations, in order to match the thermal importance of regions of the meter 5.

The compensation equation can comprise:

$$\text{comp} = K1 * T_{tube} + K2(T*(T_{tube} - T_{case})) \qquad (1)$$

The first compensation term ($K1*T_{tube}$) is for modulus compensation of the flow tube or tubes. The second compensation term ($K2*(T_{tube}-T_{case})$) is for thermal stress compensation.

Generally, if the tubes 131, 131' and the case 300 are of the same material (they usually are for curved tubes), then thermal stress generally only occurs with a difference in temperature between the case average temperature and the tube temperature.

Figure 4:
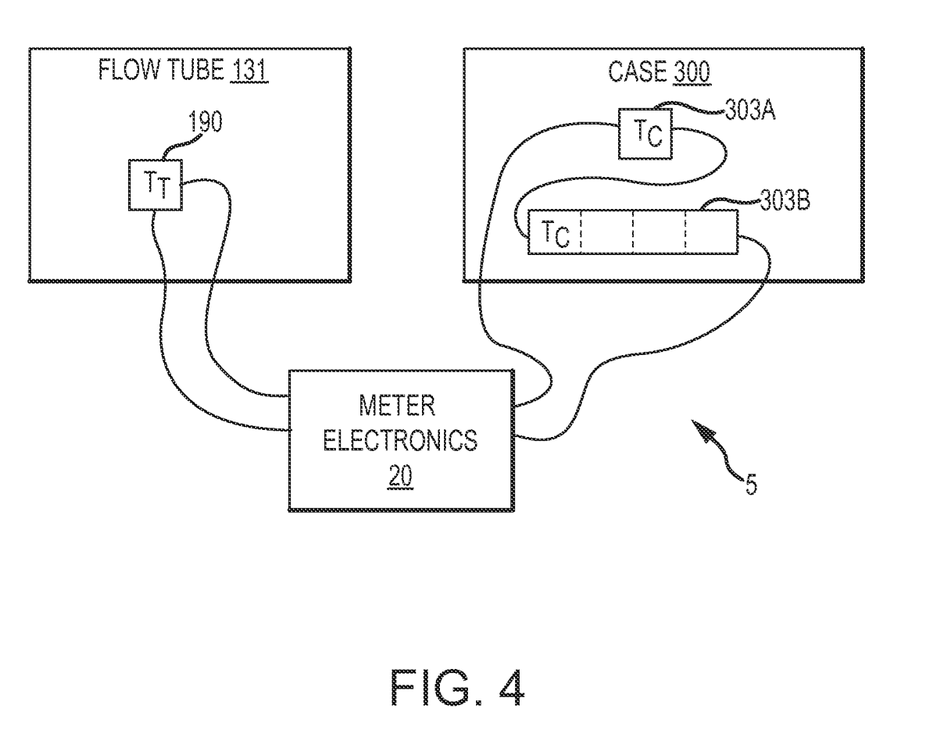
FIG. 4 shows a case temperature sensor network of the curved tube vibrating flow meter according to another embodiment of the invention.

FIG. 4 shows a case temperature sensor network of the curved tube vibrating flow meter 5 according to another embodiment of the invention. In this embodiment, the curved tube vibrating flow meter 5 includes the flow tube temperature sensor $T_T$ 190, a first case temperature sensor $T_C$ 303A, and a second case temperature sensor $T_C$ 303B. However, the second case temperature sensor $T_C$ 303B does not comprise a standard RTD resistance value in this embodiment and instead the figure illustrates a custom temperature sensor that forms a desired thermal importance ratio for the case 300. A temperature importance ratio can be achieved by employing temperature sensors having predetermined resistance values.

In the example shown, the first case temperature sensor $T_C$ 303A is chosen to have a resistance that is equivalent to a standard RTD and the second case temperature sensor $T_C$ 303B is chosen to have a resistance that is equivalent to four standard RTDs. Other resistance values can be selected and other resistance ratios can be constructed. Connecting these two case temperature sensors in series results in a network in which the total case resistance is five times that of a standard RTD resistance value. The case temperature sensor forms a resistance (and thermal importance) ratio, wherein the first case temperature sensor $T_C$ 303A is only one-fifth of the total resistance of the case temperature sensor network. As a result, changes in temperature at the first case temperature sensor $T_C$ 303A will have much less impact on the overall case temperature measurement.

In some embodiments, the first case temperature sensor 303A may be located at or near the top of the case 300 and the second case temperature sensor 303B may be located at or near the bottom. Therefore, for a given case temperature change, the case bottom resistance change for a given temperature change will be about four times that of the case top resistance change. This would represent a condition where the temperature of the case bottom has four times the effect on the combined temperature as the temperature of the case top.

This configuration illustrates one of the differences in the thermal compensation between straight tube meters and curved tube meters. In straight tube meters, the case is generally cylindrical and thus one side (or region) of such a cylindrical case has no more thermal importance than another. In curved tube meters, in contrast, the lack of complete symmetry about the tube axis can necessitate multiple temperature sensors because, for example, the top of the case may have a different temperature than the bottom of the case. Furthermore, the lack of symmetry may cause one part of the case to impart more thermal stress on the flow tube than another part of the case.

Figure 5:
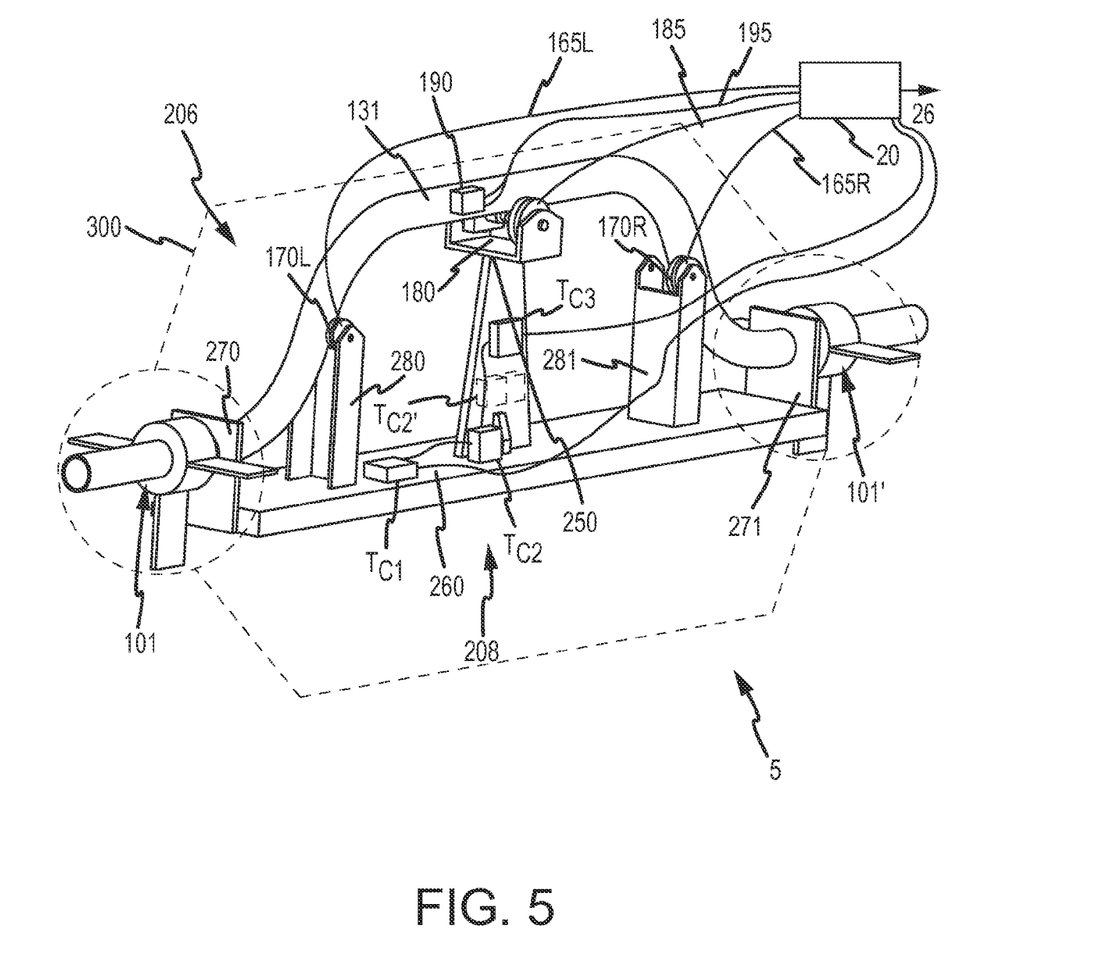
FIG. 5 illustrates an example of a single curved tube vibrating flow meter comprising a sensor assembly and a balance structure.

FIG. 5 illustrates an example of a single curved tube vibrating flow meter 5 comprising a sensor assembly 206 and a balance structure 208. The meter electronics 20 are connected to the sensor assembly 206 via leads 165L, 165R, 185, and 195.

The sensor assembly 206 includes a single curved flow tube 131 that defines a flow path for receiving a flowing substance. When sensor assembly 206 is inserted into a pipeline system or assembly which carries the flowing substance, the substance enters sensor assembly 206 through an inlet flange and flows through the curved flow tube 131, where a characteristic of the flowing substance is measured.

The sensor assembly 206 includes a driver 180. The driver 180 includes a first portion connected to a driven member 250 of the balance structure 208 and a second portion connected to the curved flow tube 131. The first and second portions may correspond to a drive coil and a drive magnet, for example. In the present embodiment, the driver 180 preferably drives the driven member 250 and curved flow tube 131 in phase opposition about a bending axis X, which is defined in part by the connectors 270, 271. According to an embodiment of the invention, the bending axis X corresponds to the inlet-outlet tube axis. The driven member 250 bends from the base 260 and thus does not have a stationary bending axis. The driver 180 may comprise one of many well known arrangements, including for example, and not limitation piezoelectric elements or an electromagnetic coil/magnet arrangement.

The sensor assembly 206 includes at least one pick-off and in the present embodiment is shown provided with a pair of pick-offs 170L, 170R. According to one aspect of the present embodiment, the pick-offs 170L, 170R measure the motion of the curved flow tube 131. In the present embodiment, the pick-offs 170L, 170R include a first portion located on respective pick-off arms 280, 281 and a second portion located on the curved flow tube 131. The pick-off(s) may comprise one of many well known arrangements, including for example, and not limitation piezoelectric elements, capacitance elements, or an electromagnetic coil/magnet arrangement. Therefore, like the driver 180, the first portion of the pick-off may comprise a pick-off coil while the second portion of the pick-off may comprise a pick-off magnet. Those of ordinary skill in the art will appreciate that the motion of the curved flow tube 131 is related to certain characteristics of the flowing substance, for example, the mass flow rate or density of the flowing substance through the curved flow tube 131.

Those of ordinary skill in the art will appreciate that the one or more meter electronics 20 receive the pick-off signals from the pick-offs 170L, 170R and provide a drive signal to the driver 180. The one or more electronics 20 can measure a characteristic of a flowing substance, such as, for example, density, mass flow rate, volume flow rate, totalized mass flow, temperature, and other information. The one or more electronics 20 may also receive one or more other signals from, for example, one or more temperature sensors 190 and one or more pressure sensors (not shown), and use this information to measure a characteristic of a flowing substance. Those of ordinary skill in the art will appreciate that the number and type of sensors will depend on the particular measured characteristic.

According to one aspect of the present embodiment, the balance structure 208 is configured to at least partially balance the vibrations of the curved flow tube 131. According to one aspect of the present embodiment, the balance structure 208 is configured to at least partially balance the momentum of the curved flow tube 131.

The balance structure 208 includes a base 260 connected to a driven member 250. As shown, the driven member 250 is preferably a cantilevered arm that extends generally orthogonal from the base 260. The base 260 in the present embodiment is preferably relatively massive and immobile as compared to the driven member 250. For example, and not limitation, the base 260 may be provided with a mass at least 5 times greater than that of the driven member 250. For example and not limitation, the base 260 may be provided with a mass at least 5 times greater than the mass of the curved flow tube 131. In some embodiments, these numbers may be greater, for example 14 and 8 times greater than the driven member 250 and the curved flow tube 131, respectively.

The balance structure 208 in the present embodiment is coupled to the curved flow tube 131. As shown, the base 260 includes a pair of connectors 270, 271, which may be in the form of the plates shown or which may be provided with any other shape.

According to one aspect of the present embodiment, the curved flow tube 131, the driven member 250, and the base 260 are configured to provide a balanced system. It should be appreciated that the system may not be absolutely balanced. In the present embodiment, the curved flow tube 131 and the driven member 250 act as two separate vibrating systems, which are driven at equal resonant frequencies, in phase opposition about the axis X.

The sensor assembly 206 may also include a case 300 and case connects 290, 291. The case connects 290, 291 may comprise the only structures supporting the conduit between the connectors 270, 271. The flow meter 5 in this embodiment may include case temperature sensors $T_C$ 303 such as a first case temperature sensor $T_{C1}$ located about twenty-five percent in from the end (or case connect), a second case temperature sensor $T_{C2}$ located at the base of the driven member 250, and a third case temperature sensor $T_{C3}$ located about halfway up the driven member 250. Alternatively, a second temperature sensor $T_{C2}'$ of twice the normal resistance could be substituted for the second case temperature sensor $T_{C2}$ and the third case temperature sensor $T_{C3}$. The second temperature sensor $T_{C2}'$ could be located about twenty-five percent up the driven member 250, for example. It should be understood that the case temperature sensors and locations given above are merely examples and are not limiting. The sensor values and sensor locations can be varied as needed and remain within the scope of the description and claims.

Although the present invention has been described in terms of resistive temperature sensors, those skilled in the art recognize that any type of resistive sensor could be used in place of a temperature sensor. For example, one might use a strain gauge which indicates strain in the form of a variable resistance in place of one or more of the temperature sensors described herein. The present invention can be applied using any sensor that indicates a condition by changing its resistance. The essence of the present invention applies equally to any such a configuration.

The curved tube vibrating flow meter according to the invention can be employed according to any of the embodiments in order to provide several advantages, if desired. The meter according to the invention provides a thermal stress compensated curved tube meter.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Accordingly, the scope of the invention should be determined from the following claims.

What is claimed is:

1. A curved tube vibrating flow meter (5), comprising:
    a flow tube temperature sensor $T_T$ (190) affixed to one or more curved flow tubes (131, 131') of the curved tube vibrating flow meter (5), with the flow tube temperature sensor $T_T$ (190) generating a flow tube temperature signal;
    a plurality of case temperature sensors $T_C$ (303) affixed to one or more case locations of a case (300) of the curved tube vibrating flow meter (5) and generating a case temperature signal, wherein a plurality of case temperature sensor resistances at the one or more case locations form a combined case resistance related to thermal importances of the one or more case locations; and
    meter electronics (20) configured to receive the flow tube temperature signal, receive the case temperature signal, and compensate the curved tube vibrating flow meter (5) for thermal stress using the flow tube temperature signal and the case temperature signal.

2. The curved tube vibrating flow meter (5) of claim 1, further comprising a single curved tube vibrating flow meter (5).

3. The curved tube vibrating flow meter (5) of claim 1, further comprising a dual curved tube vibrating flow meter (5).

4. The curved tube vibrating flow meter (5) of claim 1, wherein the plurality of case temperature sensors $T_C$ (303) generate a representative case temperature signal.

5. The curved tube vibrating flow meter (5) of claim 1, with the one or more case locations comprising two or more case locations, wherein the plurality of case temperature sensors $T_C$ (303) form a predetermined case resistance ratio related to thermal importances of each case location of the two or more case locations.

6. The curved tube vibrating flow meter (5) of claim 1, with the meter electronics (20) being further configured to compensate the curved tube vibrating flow meter (5) for a change in curved tube bending stress with a change in temperature, with the compensating using the flow tube temperature signal and the case temperature signal.

7. The curved tube vibrating flow meter (5) of claim 1, wherein the curved tube vibrating flow meter (5) includes a manifold (150 or 150') and a first case temperature sensor $T_C$ (303) is located on the case (300) substantially at the manifold (150 or 150').

8. The curved tube vibrating flow meter (5) of claim 1, wherein a second case temperature sensor $T_C$ (303B) is located substantially on the case (300) between tube ends.

9. A curved tube vibrating flow meter (5), comprising:
    a flow tube temperature sensor $T_T$ (190) affixed to one or more curved flow tubes (131, 131') of the curved tube vibrating flow meter (5), with the flow tube temperature sensor $T_T$ (190) generating a flow tube temperature signal;
    a plurality of case temperature sensors $T_C$ (303) affixed to two or more case locations of a case (300) of the curved tube vibrating flow meter (5) and generating a case temperature signal, wherein a plurality of case temperature sensor resistances at the two or more case locations form a predetermined case resistance ratio related to thermal importances of the two or more case locations, wherein the plurality of case temperature sensors $T_C$ (303) generate a representative case temperature signal;

meter electronics (20) configured to receive the flow tube temperature signal, receive the case temperature signal, and compensate the curved tube vibrating flow meter (5) for thermal stress using the flow tube temperature signal and the case temperature signal.

10. The curved tube vibrating flow meter (5) of claim 9, further comprising a single curved tube vibrating flow meter (5).

11. The curved tube vibrating flow meter (5) of claim 9, further comprising a dual curved tube vibrating flow meter (5).

12. The curved tube vibrating flow meter (5) of claim 9, with the meter electronics (20) being further configured to compensate the curved tube vibrating flow meter (5) for a change in curved tube bending stress with a change in temperature, with the compensating using the flow tube temperature signal and the case temperature signal.

13. The curved tube vibrating flow meter (5) of claim 9, wherein the curved tube vibrating flow meter (5) includes a manifold (150 or 150') and a first case temperature sensor $T_C$ (303) is located on the case (300) substantially at the manifold (150 or 150').

14. The curved tube vibrating flow meter (5) of claim 9, wherein a second case temperature sensor $T_C$ (303B) is located substantially on the case (300) between tube ends.

15. A thermal stress compensation method in a curved tube vibrating flow meter, the method comprising:
   measuring a flow tube temperature of a curved flow tube of the curved tube vibrating flow meter and generating a flow tube temperature signal;
   measuring a case temperature using a plurality of case temperature sensors affixed to one or more case locations of a case of the curved tube vibrating flow meter and generating a case temperature signal, wherein a plurality of case temperature sensor resistances at the one or more case locations form a combined case resistance related to thermal importances of the one or more case locations; and
   compensating the curved tube vibrating flow meter for thermal stress using the flow tube temperature signal and the case temperature signal.

16. The method of claim 15, with the curved tube vibrating flow meter comprising a single curved tube vibrating flow meter.

17. The method of claim 15, with the curved tube vibrating flow meter comprising a dual curved tube vibrating flow meter.

18. The method of claim 15, wherein the plurality of case temperature sensors generate a representative case temperature signal.

19. The method of claim 15, with the one or more case locations comprising two or more case locations, wherein the two or more case temperature sensors form a predetermined case resistance ratio related to thermal importances of each case location of the two or more case locations.

20. The method of claim 15, further comprising compensating the curved tube vibrating flow meter for a change in bending stress with a change in temperature, with the compensating using the flow tube temperature signal and the case temperature signal.

* * * * *